(12) United States Patent
Senger

(10) Patent No.: US 10,638,875 B2
(45) Date of Patent: May 5, 2020

(54) DEVICE AND METHOD FOR CLEANING ESPRESSO MACHINES

(71) Applicant: Alexander Senger, St. Gallen (CH)

(72) Inventor: Alexander Senger, St. Gallen (CH)

( * ) Notice: Subject to any disclaimer, the term of this patent is extended or adjusted under 35 U.S.C. 154(b) by 0 days.

(21) Appl. No.: 16/061,288

(22) PCT Filed: Dec. 9, 2016

(86) PCT No.: PCT/EP2016/080457
§ 371 (c)(1),
(2) Date: Jun. 11, 2018

(87) PCT Pub. No.: WO2017/097988
PCT Pub. Date: Jun. 15, 2017

(65) Prior Publication Data
US 2019/0335945 A1    Nov. 7, 2019

(30) Foreign Application Priority Data

Dec. 10, 2015  (DE) .......................... 10 2015 224 861
Jun. 24, 2016  (DE) .......................... 10 2016 211 375

(51) Int. Cl.
*A47J 31/60*   (2006.01)
*B08B 1/00*    (2006.01)
*A46B 9/02*    (2006.01)

(52) U.S. Cl.
CPC ................. *A47J 31/60* (2013.01); *A46B 9/02* (2013.01); *B08B 1/002* (2013.01);
(Continued)

(58) Field of Classification Search
CPC . A47J 31/60; B08B 1/00; B08B 1/001; B08B 1/002; A47L 25/00; A46B 9/00;
(Continued)

(56) References Cited

U.S. PATENT DOCUMENTS 490,682 A  *   1/1893  Roemer ..................... 15/104.04
3,824,913 A       7/1974  Herman et al.
4,301,567 A  *  11/1981  Tucker ..................... A46B 7/04
                                                                15/104.04

(Continued)

FOREIGN PATENT DOCUMENTS

DE    102008029366    12/2009
DE    202013104522    12/2013
(Continued)

*Primary Examiner* — Mark Spisich
(74) *Attorney, Agent, or Firm* — Bonini IP Law, LLC; Frank J. Bonini, Jr.

(57) ABSTRACT

A method and a device for cleaning espresso machines, wherein the device (10) comprises at least one annular or hollow-cylindrical bristle carrier element, wherein at least one groove-bristle element (18) for cleaning a portafilter groove (66) is arranged on an end face or lateral surface of the bristle carrier element, wherein the at least one groove-bristle element (18) projects from the end face or lateral surface, wherein at least a partial section of the at least one groove-bristle element (18) projects in the radial direction, and/or at least a partial section of the groove-bristle element (18) is concavely curved and/or in that at least one bristle element (17) is arranged on an inner lateral surface of the annular or hollow-cylindrical bristle carrier element.

20 Claims, 7 Drawing Sheets

(52) U.S. Cl.
CPC ... *A46B 2200/30* (2013.01); *A46B 2200/3033* (2013.01); *A46B 2200/3073* (2013.01)

(58) Field of Classification Search
CPC ........... A46B 9/02; A46B 9/025; A46B 9/026; A46B 9/028; A46B 15/00; A46B 2200/30; A46B 2200/3033; A46B 2200/3073
USPC ....... 15/104.03, 104.04, 104.001, 159.1, 160
See application file for complete search history.

(56) References Cited

U.S. PATENT DOCUMENTS

| | | | | |
|---|---|---|---|---|
| 4,733,423 | A * | 3/1988 | Blatt | A46B 9/02 15/104.04 |
| 4,763,380 | A * | 8/1988 | Sandvick | A46B 11/063 15/104.04 |
| 4,813,091 | A * | 3/1989 | Glasener | A46B 9/02 15/104.04 |
| 5,379,474 | A * | 1/1995 | Nakamura | A46B 9/02 132/73.6 |
| 7,594,292 | B1 | 9/2009 | Pelo | |
| 2004/0226576 | A1* | 11/2004 | Hambalek | B08B 1/04 134/6 |
| 2011/0314619 | A1* | 12/2011 | Schweikert | A61C 19/002 15/104.93 |

FOREIGN PATENT DOCUMENTS

| | | | |
|---|---|---|---|
| FR | 2671745 | * | 7/1992 |
| IT | 1235949 | | 12/1992 |
| KR | 20120003172 | | 5/2012 |
| KR | 20120003242 | | 5/2012 |
| KR | 200469938 | | 11/2013 |
| WO | 2005104916 | | 11/2005 |
| WO | 2014053181 | | 4/2014 |

\* cited by examiner

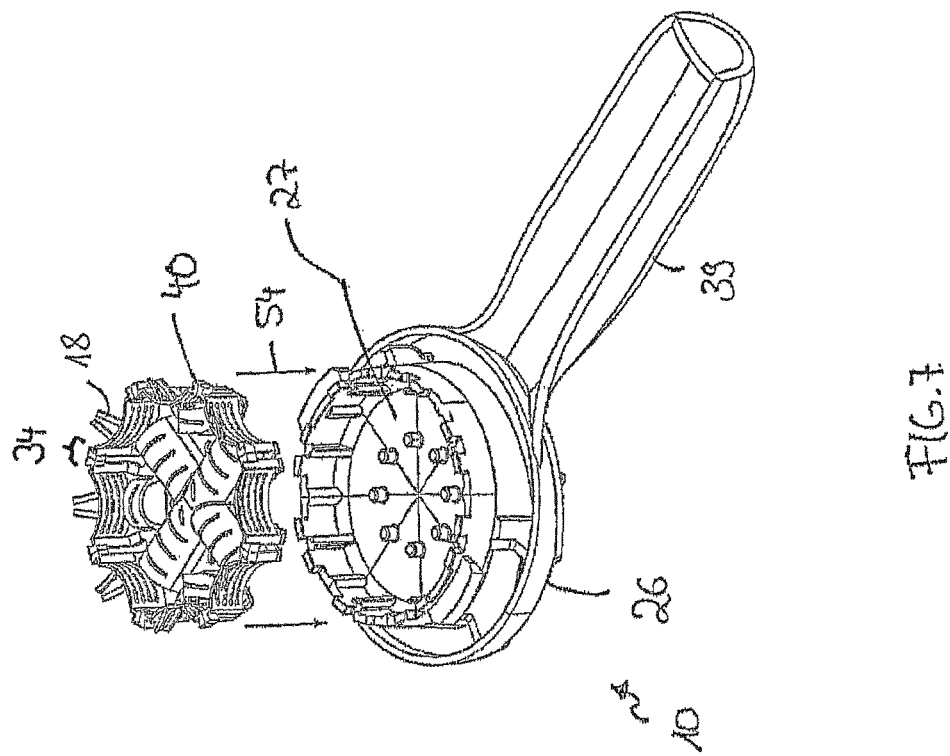
FIG. 7
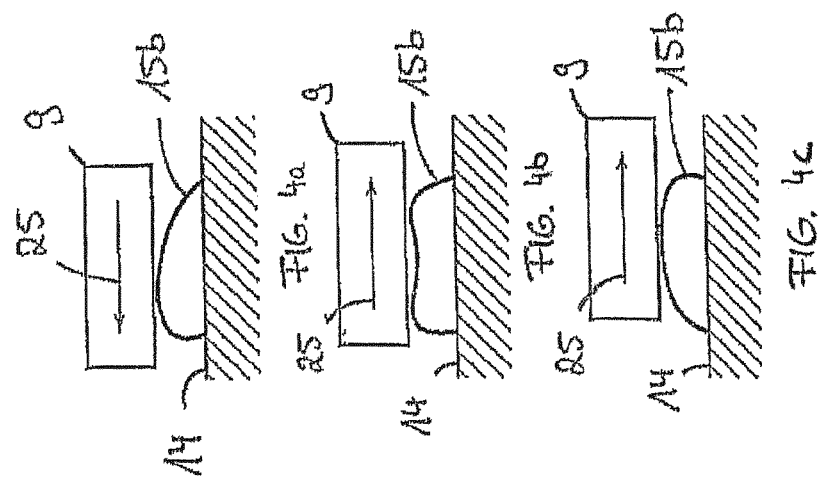
FIG. 4a
FIG. 4b
FIG. 4c

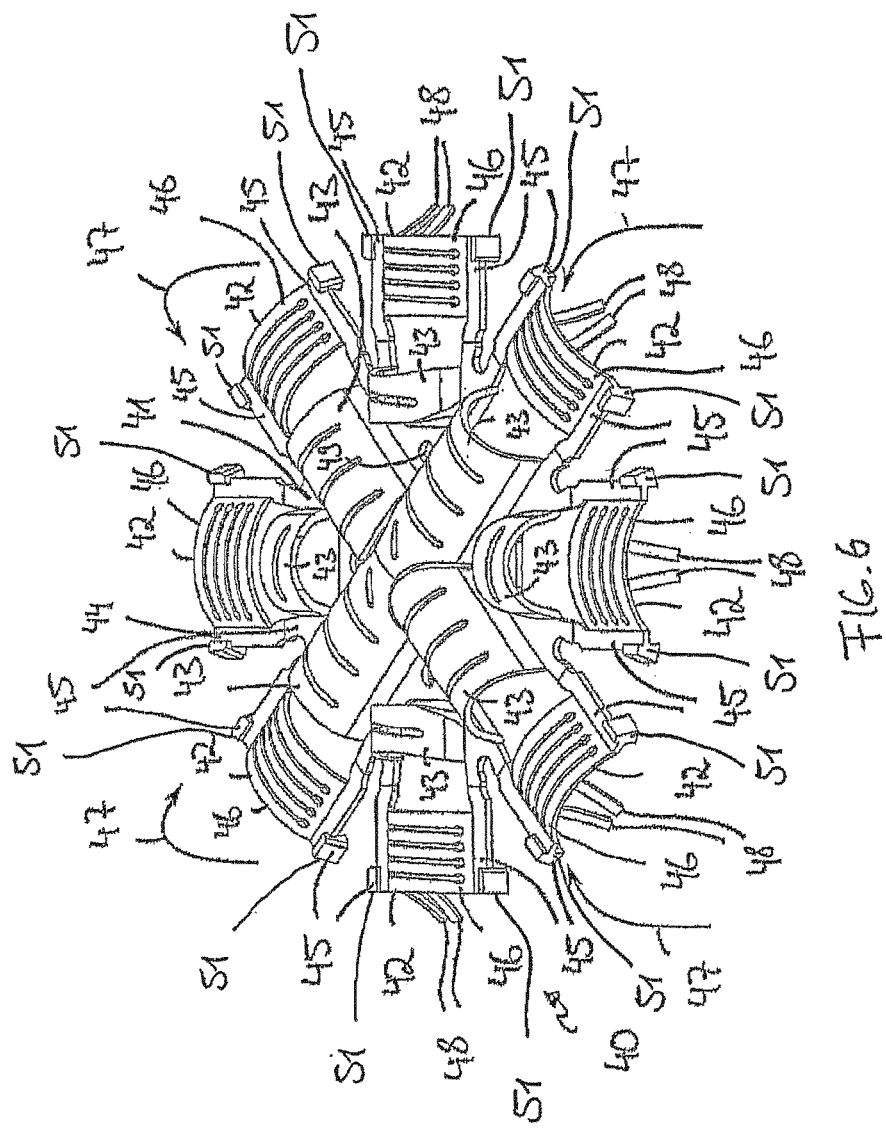

DEVICE AND METHOD FOR CLEANING ESPRESSO MACHINES

BACKGROUND OF THE INVENTION

1. Field of the Invention

The invention relates to a device and a method for cleaning espresso machines.

2. Brief Description of the Related Art

So-called portafilter espresso machines are widely used and sold in large quantities. The annual production volume in Europe is estimated to be around 190,000 units. FIG. 1 is a schematic section through a group head 1, wherein adhering coffee residue 7 is shown as an example. It is illustrated that coffee residue 7 may adhere to an underside and outer lateral surfaces of a so called shower 9 of the group head as well as to a seal 8.

This soiling may occur after relatively few brewing operations. Due to oxidation and biological degradation processes in the moist and warm coffee residue 7, there may be significant negative effects on the taste of the coffee. Furthermore, residual coffee powder is abrasive to a seal 8 between the portafilter and the group head 1 and may cause wear thereon. Regular cleaning of the group head, in particular a daily cleaning, is therefore desirable. Solutions are known in which the group head is brushed out with a brush while water is running from the shower. Due to the intricate configuration of the group head and, possibly, high water temperatures, this may be a process that is dangerous for the user and often only leads to poor cleaning.

For loading the portafilter, the group head 1 has a groove 66 for portafilter cams (portafilter groove 66). In this case, the portafilter cams may be inserted into this portafilter groove 66 from below. The portafilter groove 66 makes it possible to load the portafilter. It is possible for coffee residue 7 to adhere in this portafilter groove 66, as well. It is therefore desirable to clean this portafilter groove 66. Also illustrated is a water supply channel 6 through which hot water flows into the group head 1 at a pressure of 8 bar to 10 bar.

U.S. Pat. No. 7,594,292 B1 describes a device for cleaning an espresso machine having a brush head that is arranged on a brush neck. The brush neck is furthermore arranged on a handling section.

IT 1235949 B describes an electrically operated brush with bristles, wherein the bristles have different heights. The bristles project from a surface of a rotatable part.

WO 2014/053181 A1 discloses a cleaning membrane for sealing a flow path of a screen holder for cleaning a coffee machine. KR 20120003242 and KR 2012003172 U disclose cleaning devices that are embodied similar to a portafilter and have bristles. The bristles project upward from upwardly oriented surfaces of a stepped surface.

SUMMARY OF THE INVENTION

A method and a device for the cleaning espresso machines that enable thorough and reliable cleaning with simple handling, in particular thorough and reliable cleaning of the groove for portafilter cams are provided. Additional advantageous embodiments of the invention are shown and described herein.

A device for cleaning espresso machines is suggested. The device may be used for cleaning similar to a portafilter in a group head of an espresso machine. In particular, the device cleans an underside and lateral surfaces of a so-called shower of the espresso machine and/or cleans the portafilter groove.

The device comprises at least one annular or hollow-cylindrical bristle carrier element. As shall be explained in greater detail in the following, the bristle carrier element may in particular be a cup-shaped element. An annular bristle element may have a closed edge profile. Thus the term annular bristle element includes polygonal, e.g. octagonal, annular bristle elements or oval bristle elements.

At least part of the bristle carrier element may comprise an elastic material. Furthermore, the bristle carrier element may have a center longitudinal axis that may correspond, e.g., to a center axis of symmetry of the ring or hollow cylinder. Moreover, an annular or hollow-cylindrical bristle carrier element may be open on or to one or both end faces. A diameter of the bristle carrier element may be greater than a diameter of the shower of the group head of the espresso machine to be cleaned, in particular 5 mm to 10 mm greater. An inner diameter of the bristle carrier element may be, e.g., in a range of 60 mm to 65 mm.

The bristle carrier element being annular or hollow-cylindrical also includes the case that the bristle carrier element is essentially embodied in an annular or hollow-cylindrical shape. This may mean that the bristle carrier element is not embodied in an exactly annular or hollow cylindrical shape, in particular due to recesses or bulges, e.g. in the region of the lateral surface or end face(s).

According to the invention, at least one groove-bristle element for cleaning a portafilter groove of the espresso machine is arranged on an end face or on a lateral surface, preferably an outer lateral surface, of the bristle carrier element. The portafilter groove is in particular arranged in the group head of the espresso machine. The at least one groove-bristle element here projects from the end face or lateral surface. This may mean that the groove-bristle element extends away from the end face or lateral surface. The fact that the at least one groove-bristle element cleans the portafilter groove does not preclude other elements of the espresso machine, in particular a surface of a seal and of an outside of a shower of the espresso machine, from being cleaned by means of the groove-bristle element.

Furthermore, at least one partial section of the at least one groove-bristle element projects in the radial direction from the end face or lateral surface. The radial direction may be the bristle carrier element, wherein the radial direction may be oriented outward from the center longitudinal axis of the bristle carrier element. In other words, the groove-bristle element does not project exclusively in or parallel to the axial direction of the center longitudinal axis from the end face or lateral surface of the bristle carrier element.

In particular, the at least one partial section projects outward in the radial direction. It is possible for another partial section of the at least one groove-bristle element to project in the axial direction from the end face or lateral surface, that is, in particular, upward. The groove-bristle element may thus project upward and outward from the end face or lateral surface.

Directional indications such as "up" and "down" may relate to a direction parallel to a center axis of symmetry of the shower of the group head of the espresso machine to be cleaned, wherein a portafilter or the bristle carrier element is inserted into the group head upward from below.

Thus, at least a part of the groove-bristle element may be outwardly bent or curved in the radial direction. For example, the partial section projecting in the radial direction may be, in particular, a bent or curved section. This may mean that a directional vector of an orientation of a center line of a groove-bristle element, at at least one point or section of the center line, has a portion oriented parallel to a radial line that extends in a plane perpendicular to the center longitudinal axis from the center longitudinal axis through the point/section, wherein this portion of the directional vector is additionally oriented away from the center longitudinal axis.

Furthermore, the feature that at least one partial section of the at least one groove-bristle element projects in the radial direction may mean that the groove-bristle element extends away in the radial direction, in particular outward, from the end face or lateral surface, at least in this partial section. It is of course also possible for the entire bristle element, and not just a partial section of the bristle element, to project in the radial direction. Alternatively or cumulatively, at least one partial section of the groove-bristle element is concavely curved. The concave curvature, that is, an inward curvature, may be a curvature from the end face or the lateral surface of the bristle carrier element toward the center longitudinal axis of the bristle carrier element. Thus, a partial section may have or embody a surface curved toward the center longitudinal axis of the bristle carrier element. When the bristle carrier element has been inserted into the group head, the concavely curved partial section may be curved toward a lateral surface of the shower of the group head. The groove-bristle element may thus also have an inwardly curved or bent partial section. The curvature may in particular result with respect to a plane in which an outermost edge point of the groove-bristle element and the contact section(s) or point(s) of the groove-bristle element with the bristle carrier element are arranged.

An embodiment is also possible in which a groove-bristle element having at least one partial section projecting in the radial direction additionally has or embodies a concavely curved partial section.

In particular, the at least one groove-bristle element may project such that at least a part of the groove-bristle element is arranged in a two-dimensional projection plane outside the bristle carrier element when both the groove-bristle element and the bristle carrier element are projected into this projection plane, wherein the projection plane is orthogonal to the center longitudinal axis.

One dimension of the groove-bristle element may be adapted to a dimension of the portafilter groove. The groove-bristle element is preferably formed geometrically such that a maximum height of a section of the groove-bristle element along the axial direction over an attaching section of the groove-bristle element on the end face or lateral surface is within a range of 10 mm (inclusive) to 20 mm (inclusive). The height of the groove-bristle element may thus be a distance from an attaching section of the groove-bristle element, e.g. to an end face of the bristle carrier element, the distance being measured along or parallel to the center longitudinal axis. A length of the groove-bristle element may be a length of a center line of the groove-bristle element, in particular a length of the center line to a free end of the groove-bristle element. A width of a groove-bristle element may be a dimension of the groove-bristle element along a circumferential direction.

Due to the embodiment of the groove bristle element such that at least one partial section projects in the radial direction and/or at least one partial section is concavely curved, the at least one groove bristle element is embodied such that when the bristle carrier element is inserted into the group head, in particular when inserted upward from below, an upper edge section of the groove-bristle element is positioned against a limiting wall, in particular an upper limiting wall, of the portafilter groove. As explained in the foregoing, this limiting wall may also be embodied by a seal. The portafilter groove is enclosed or surrounded by one or a plurality of limiting walls. When inserted further, the upper edge portion of the bristle element may then open outward in the radial direction, the groove-bristle element extending along the upper limiting wall of the portafilter groove and, when inserted further, also along other limiting walls, e.g., lateral limiting walls, of the portafilter groove. Thus, when the device is inserted into the group head of the espresso machine, the groove-bristle element may execute a curling movement, wherein the curled portion created projects from the bristle carrier element outward in the radial direction.

If the bristle carrier element is now rotated, for example with a suitable actuating element, for example a handle, the groove-bristle element wipes the limiting walls surrounding the portafilter groove and may remove adhering particles, in particular coffee residue. The groove-bristle element preferably comprises an elastomer, in particular silicone rubber. Furthermore, the groove-bristle element may have a Shore A hardness in a range of 40 to 80. Shore A hardness is defined in DIN EN ISO 868: 2003-10 and DIN ISO 7619-1: 2012-02.

It is possible for the groove-bristle element to be embodied as a rod-shaped, tongue-shaped, or plate-shaped element. A plate-shaped embodiment may mean that a ratio between length and width of the groove-bristle element or a ratio between height and width of the groove-bristle element is less than 5:1.

The groove-bristle element is preferably arranged and/or embodied such that it essentially retains its shape during the rotation of the bristle carrier element about the longitudinal axis for cleaning the portafilter groove. This may mean that the groove-bristle element has sufficient flexural and/or rotational stiffness.

Alternatively or cumulatively, at least one bristle element is arranged on an inner lateral surface of the annular or hollow-cylindrical bristle carrier element. The bristle element may be a bristle element for cleaning a lateral surface of the shower of the group head. Furthermore, the bristle element may be arranged on a section of the inner lateral surface.

In particular if the bristle carrier element is embodied as a cup-shaped element and at least one shower bristle element is arranged on a bottom surface of the cup-shaped element, the bristle element arranged on the inner lateral surface may be called an additional bristle element or an additional shower bristle element. In this embodiment, as well, the bristle carrier element may be embodied as a cup-shaped element, wherein in this case the other shower bristle element is arranged on the inner lateral surface of the cup-shaped element. The bristle element arranged on the inner lateral surface may extend into the inner volume along or in opposition to a radial direction. The radial direction may be oriented orthogonal to the center longitudinal axis.

In the following, shower bristle elements may also simply be called bristle elements, wherein groove-bristle elements shall only be called groove-bristle elements throughout, however. The groove-bristle element(s) and the shower bristle elements may be embodied from an elastic material. An inner diameter of the bristle carrier element, in particular the cup-shaped element, may be in a range of 60 mm to 65 mm. Bristle elements may extend from or project over the specific surface in a range of 0.1 mm to 5 mm. In this way different types of machines may be advantageously cleaned.

For example, a diameter of the shower varies in different machine types in a range of 54 mm to 59 mm. If the bristle elements project far beyond the specific surface, this advantageously permits machines having a small shower diameter to be cleaned, as well.

The bristle carrier element, in particular cup-shaped element, may be arranged for cleaning in the group head such that the shower of the group head is arranged completely or at least in part in the inner volume of the cup-shaped element. Bristle elements on the floor surface may then contact a lower end face of the shower, while bristle elements on the inner lateral surface area may contact the lateral surfaces of the shower. The lower end face of the shower may have at least one outlet opening for water. In this state, the cup-shaped element may be rotated about the center longitudinal axis, which causes the bristle elements to wipe the corresponding surfaces of the shower and release particles adhering thereto. The cleaning may be supported in that water, in particular hot water, is pumped through the group head during the rotation. The water may flow through the shower into the inner volume of the cup-shaped element and, as it flows out, transport released particles out of the internal volume.

The bristle elements arranged on the inner lateral surface of the cup-shaped element advantageously permit improved release of particles on lateral surfaces of the shower, so that improved cleaning of the espresso machine is then possible. By using a bristle carrier element, especially a cup-shaped element, easy handling is ensured, since the cup-shaped element does not have to perform complex movements for cleaning, but instead only a simple rotation about the center longitudinal axis.

Overall, the device advantageously permits the reliable and most complete possible cleaning of the shower and/or portafilter groove. Furthermore, the groove-bristle elements advantageously make it possible for the seal of a group head to be thoroughly cleaned, as well. In particular, the bristle carrier element may be inserted into the group head such that the groove-bristle elements also contact a seal of the group head. When the bristle carrier element is rotated, the groove-bristle elements on the end face wipe a surface of the seal and thus also release particles adhering thereto.

In another embodiment, a width of the at least one groove-bristle element along a circumferential direction of the bristle carrier element is greater than 50% of a height of the groove-bristle element. The width of the groove bristle element along the circumferential direction is preferably more than 80%, more preferably more than 100%, of the height of the groove bristle element.

This advantageously results in a sufficiently stiff embodiment of the groove-bristle element so that, when the bristle carrier element is rotated about its center longitudinal axis, the groove-bristle element retains its shape even when there is contact with limiting walls of the portafilter groove. This in turn advantageously results in reliable and thorough cleaning.

In another embodiment, the at least one groove-bristle element is embodied in the shape of an arc. The at least one arcuate bristle element or at least a part thereof may project in the radial direction from the end face or lateral surface of the bristle carrier element. In other words, the groove-bristle element embodied as an arcuate element may extend along the circumferential direction of the bristle carrier element. In this case, the groove-bristle element may be semicircular or semi-annular, for example. Both arc ends of the arcuate bristle element may be arranged or attached to the end face or lateral surface of the bristle carrier element. If the arcuate groove-bristle element is arranged with both arc ends on the bristle carrier element, the groove-bristle element may at least partially comprise a through-opening.

At least one recess and/or at least one projection may be arranged or embodied on an outer arc edge and/or on an inner arc edge. For example, an outer arc edge and/or an inner arc edge may be serrated. The embodiment as an arcuate element advantageously results in high stiffness of the groove-bristle element against forces acting tangentially to the carrier element, while the stiffness against tangential bending moment is low. This is particularly advantageous for the aforesaid curling movement and the closest possible positioning against the surfaces to be cleaned.

Furthermore, a center section of the at least one arcuate groove-bristle element is connected to the bristle carrier element via at least one center web. The center web may thus extend, at least partially, through the through-opening enclosed by the arcuate groove-bristle element.

The center web forms a part of the bristle element. The center web may preferably embodied curved concavely or have a concavely curved section, in particular a section concavely curved inward toward the center longitudinal axis of the bristle carrier element. This advantageously results, on the one hand, in increased stiffness of the groove-bristle element. Furthermore, the arrangement of the center web also results in the desired movement of the groove-bristle element along limiting walls of the portafilter groove when the device is inserted into the group head, as has been explained above.

Preferably at least one part of an edge section, in particular a radially outer edge section, of the at least one groove-bristle element is curved or bent in the radial direction, in particular outward. If the groove-bristle element has a free end or a tip, for example in the case of a bristle-shaped or plate-shaped groove-bristle element, a section having this free end may be curved or kinked, in particular in the radial direction. If the groove-bristle element is embodied in an arcuate manner, a section of the groove-bristle element comprising the outer arc edge may be curved or bent, in particular in the radial direction.

This advantageously results in a more reliable movement of the groove-bristle element along the limiting walls of the portafilter groove when the device is inserted into the group head of the espresso machine. In particular, the curved or bent edge section causes the aforesaid curling movement along the limiting walls and minimizes the risk of a different course of movement.

In another embodiment, the bristle carrier element is embodied as a cup-shaped element. Thus the device comprises at least one cup-shaped element. A cup-shaped element may in particular be an at least partially hollow-cylindrical element that is open on or to at least one end face. This end face may embody a cup rim. The cup-shaped element may be closed at a side opposing this open end face and have a bottom surface. The bottom surface may preferably have a noncurved surface. The cup-shaped element may comprise, at least in part, an elastic material. The cup-shaped element may have a center longitudinal axis that may correspond to a center axis of symmetry of the cup-shaped element. At least one section of the bottom surface or the entire bottom surface may be oriented orthogonal to the center longitudinal axis.

Furthermore, at least one bristle element for cleaning a lower end face of a shower of the group head of the espresso machine is arranged on a bottom surface of the cup-shaped element. This bristle element may also be referred to as a first shower bristle element in the following. The bristle element arranged on the bottom surface may extend away from the bottom surface into an inner volume of the cup-shaped element. The inner volume may denote the volume that comprises the bottom surface and inner lateral surfaces, as well as a cover surface (not present), that would cover the open end face, of the cup-shaped element. For example, a bristle element may extend from the bottom surface parallel to the center longitudinal axis into the inner volume.

In another embodiment, at least one other bristle element for cleaning the seal of the brewing unit is arranged on an end face of the cup-shaped element. The end face may in particular be the end face of the cup-shaped arranged on the open side and may embody the cup edge. The bristle element may extend away from this end face, in particular parallel to the center longitudinal axis. Alternatively or cumulatively, the bristle element arranged on the end face may be a groove-bristle element, which was explained in the foregoing. Such bristle elements advantageously make it possible for the seal of a group head to be thoroughly cleaned as well. In particular the cup-shaped element may be inserted into the group head such that the end face contacts a seal of the group head. When the cup-shaped element is rotated, the bristle elements on the end face wipe a surface of the seal and thus also remove particles adhering thereto.

In a preferred embodiment, a shower bristle element, that is, a first and/or another shower bristle element, is embodied in the shape of an arc, both a first end of the bristle element and another end of the bristle element being connected to the inner lateral surface or to the bottom surface. In other words, the bristle element projecting from the corresponding surface into the inner volume may have an arcuate profile. This may mean that the bristle element is arched into the inner volume from the corresponding surface. This may furthermore mean that a bristle element arranged on the bottom surface or on the inner lateral surface does not have a free end that is arranged, e.g., in the inner volume.

Advantageously, an undesirably strong deformation or even a buckling of a bristle element due to changes of direction when the surface to be cleaned is being wiped is advantageously reduced. In particular, reverse folding during a change of direction of the rotation of the cup-shaped element, and the possible resulting material deformation of the bristle element, is prevented or reduced, which increases the useful life of the device. A bristle structure is also advantageously obtained that may position itself well against a surface to be cleaned and thus improves the mechanical contact with the surface. Furthermore, such an embodiment of a bristle element advantageously makes possible simpler production of the bristle elements, in particular by means of an injection-molding process.

Furthermore, a bristle element may be embodied in a plate-shape. A plate-shaped embodiment may mean that a ratio between height and width of the bristle element is less than 5:1. In particular, a plate-shaped element may have a height from a range of 5 mm to 20 mm and a width from a range of 4.0 mm to 30.0 mm. Due to a plate-shaped embodiment, the greatest possible contact surface between the bristle element and the surface to be cleaned results, so that reliable cleaning may be achieved.

Alternatively, a bristle element may be fiber-like. With a fiber-like embodiment, the ratio between height and width of the bristle element may be greater than or equal to 5:1. In particular, a fiberlike element may have a height from a range of 5 mm to 20 mm and a width from a range of 1.0 mm to 4.0 mm. This advantageously results in individual fibers better adapting themselves to locally different geometries of the surfaces to be cleaned and in water being better able to flow around the fibers. Alternatively, a bristle element, especially a plate-shaped bristle element, may be embodied as a wiping element. This is a bristle element for scraping off or wiping away coffee residue.

In the case of a plate-shaped or fiber-like bristle element, the height may correspond to the length of the bristle element. If the bristle element is arranged on an inner lateral surface of the cup-shaped section, such a bristle element may comprise at least one bristle section that extends obliquely to a radial direction into the inner volume of the cup-shaped element. If the bristle element is arranged on a bottom surface of the cup-shaped section, such a bristle element may comprise at least one bristle section that extends obliquely to a normal of the bottom surface into the inner volume of the cup-shaped element. A bristle element may also comprise a plurality of such sections, e.g. two sections. At a free end, this section may have a nose section. The nose section may be embodied, e.g., using a thickening at the free end of the section. This nose section may be moved over a surface to be cleaned during a rotation of the cup-shaped element, thereby wiping or scraping off coffee residue. The section may be embodied elastic, in particular in the form of or as a spring tongue. When a shower is arranged in the inner volume of the cup-shaped element, the section is moved out of an initial position and then pressed against the surface to be cleaned due to a spring force.

The cup-shaped element may embody such bristle elements. Alternatively, such bristle elements may also be releasably attached to the cup-shaped element.

In another embodiment, the bristle carrier element or the cup-shaped element is embodied by at least one insert element and at least one holder element. The insert element has at least one groove-bristle element and/or at least one shower bristle element or embodies the latter. Furthermore, the insert element may be arranged in, upon, or on the holder element. In this case, the device comprises the insert element and holder element. In particular, the insert element may be attached to the holder element, for example in a positive fit and/or in a force fit. If the insert element is arranged in, upon, or on the holder element, it may embody at least a part of the bottom surface and/or the inner lateral surface.

The holder element may have at least one handle. Furthermore, the holder element may have a cup-shaped section, or at least a partially cup-shaped section, wherein the insert element may be arranged in, in particular inserted into, an inner volume of this cup-shaped section. The insert element may also be cup-shaped or at least have a cup-shaped section. In particular, as will be explained in more detail in the following, the insert element may be put into different states, wherein the insert element may be arranged in a cup-shaped state in the inner volume of the cup-shaped section of the holder element or has a cup-shaped state when in the inserted state.

Both the insert element and the holder element may be manufactured using an injection molding process. The elements may simply be formed in corresponding injection molds. In particular, the elements may be manufactured without undercuts. The insert element may comprise an elastic material. The holder element may comprise a rigid, i.e. inelastic, material.

This advantageously results in simple manufacture of the device. It may also be possible to arrange insert elements having bristle elements and/or groove-bristle elements that are embodied geometrically differently, or having different geometric dimensions, in, upon, or on the holder element. This advantageously permits the device to adapt to different espresso machines.

In another embodiment, the insert element comprises at least one bottom part and at least one lateral part. The insert element preferably comprises a plurality of lateral parts, for example 8 lateral parts. An edge of the bottom part may be embodied circular or essentially circular. Lateral parts elements may be arranged along the circumference on the edge of the bottom part and project from the bottom part along a radial direction. For example, the lateral parts may project from the bottom part in octagonal symmetry. Furthermore, the bottom part may have or embody at least one bristle element of the bottom surface.

Furthermore, the at least one lateral part has or embodies at least one bristle element of the inner lateral surface. Alternatively or cumulatively, the at least one lateral part has or embodies the at least one groove-bristle element. The insert element may have at least two states. In a cup-shaped state, the lateral part of the insert element may embody at least part of the lateral part of the cup-shaped element. Further, the bottom part of the insert element may embody the bottom part of the cup-shaped element. In this state, the lateral part may be arranged inclined, in particular inclined by 90°, to the bottom part of the insert element.

In an unfolded state, the lateral part of the insert element may be not inclined to the bottom part of the insert element. In this case it may extend e.g. away from the bottom part along the radial direction. Furthermore, the insert element may be moved into the cup-shaped state from the unfolded state. For example, in the unfolded state the lateral part may be opened upward in order to produce the cup-shaped state. In particular, the lateral part may be folded upward by 90°. The cup-shaped state may thus also be referred to as a folded state. Furthermore, a lateral part may also have or embody at least one bristle element that, in the cup-shaped state, embodies the bristle element that is arranged on the end face of the cup-shaped element and that in particular cleans the seal of the group head.

The insert element may in particular comprise silicone rubber. Furthermore, the insert element may have a Shore A hardness in a range of 50 to 80, preferably 60 to 70. A thickness of the bottom part and of the lateral part of the insert member may be in a range of 1 mm to 2 mm. Because of this, the insert element and in particular the groove-bristle elements and the shower bristle elements may have sufficient elasticity and a sufficiently high elongation at break. Furthermore, such an insert element is robust against hot water and is suitable for use in contact with foodstuffs. The at least one lateral part may be pivotally attached to the bottom part, in particular to an edge section of the bottom part.

In another embodiment, the bottom part and/or the lateral part has or embodies at least one connecting means for mechanically connecting the insert element to the holder element. In particular, the insert element, i.e. the bottom part and/or the lateral part, and the holder element may have corresponding connecting means. For example, the holder element may have one or a plurality of connecting pins, the insert element having one or a plurality of recesses or openings for receiving these connecting pins. The connecting means may permit a reliable mechanical link between the holder element and the insert element, in particular a positive fit and/or force fit. The connecting means may be embodied such that the mechanical link between the insert element and the holder element is not released due to the forces acting on the insert element during insertion of the device into the group head and during rotation of the device for cleaning. This advantageously results in simple manufacture of the device, which permits reliable handling for insertion and cleaning.

In another embodiment, the insert element comprises at least two lateral parts. These lateral parts may be arranged adjacent to one another along a circumference of the bottom part. Furthermore, edge sections of the lateral parts, in particular adjacent edge sections of the lateral parts along the circumferential direction, are embodied such that, when the insert element is in the cup-shaped state, at least one connecting pin on the insert element is embodied for arrangement in a recess on the holder element and/or at least one recess on the insert element is embodied for receiving a connecting pin on the holder element. In particular, each of the adjacent lateral parts may be a part of the connecting pin, e.g. one-half of the connecting pin, and/or a part of the recess. If a lateral part has or embodies an arcuate groove-bristle element, arc ends of the groove-bristle element may be attached or connected to edge sections of the lateral part, which edge sections, in the cup-shaped state, embody a connecting pin.

When the insert element is in the cup-shaped state, the connecting pin or block may be a pin that spreads outward in the radial direction of the cup-shaped insert element. For example, the connecting pin on the insert element may be embodied as a part-pyramid, the adjacent lateral parts each forming a part, in particular one-half, of the part-pyramid-shaped connecting pin. In the cup-shaped state, the connecting pin may be arranged or embodied on an upper edge section of the lateral parts. In the cup-shaped state, a recess may be embodied beneath the connecting pin.

Furthermore, the holder element may have a recess that corresponds to the connecting pin on the insert element and in which the connecting pin may be arranged. These recesses may be arranged in the circumferential direction along an upper end face of the cup-shaped section of the holder element.

For example, this end face may be crenellated along a circumferential direction, the recess being embodied between two crenellations adjacent in the circumferential direction. The crenellations may be upwardly projecting sections on the cup rim of the cup-shaped section of the holder element and may also be called as crenellated sections.

Furthermore, such a recess may also be designed as a partial cylinder in order to receive a partially cylindrical connecting pin. Dimensions of the recess may be selected such that a force-fit connection is permitted. For example, a dimension of the recess may be selected smaller by a predetermined amount or predetermined percentage than a corresponding dimension of the connecting pin to be arranged in the recess in order to enable a form-fit and force-fit. If, for example, the connecting pin of the insert element is arranged in the recess of the holder element, a form-fit connection may be provided in the circumferential direction and in a direction opposing the radial direction and in a downwardly oriented direction. For forces acting upward, a force-fit connection may be provided. Furthermore, the cup-shaped state of the insert element is mechanically secured by arranging the connecting pin, which is embodied by two lateral parts, in a corresponding recess.

The bottom part of the insert element may also have a recess in an intermediate region between the connecting sections to the adjacent lateral parts. For example, an edge of the bottom part may have a recess, in particular an arcuate or circular recess, in this intermediate region. A recess may be embodied as a through-opening.

This recess may receive a connecting pin on the holder element. This connecting pin may extend, for example, through the aforesaid recess in the bottom part and into the recess between the lateral parts. Furthermore, such a holder element connecting pin may be embodied stepped, wherein an underside of the connecting pin embodied by the lateral parts is positioned against a first surface of the stepped holder element connecting pin when the latter is arranged in the recess between the lateral parts. Furthermore, a radially inward end face of the connecting pin embodied by the lateral parts may be positioned against another surface of the stepped connecting pin on the holder element.

Using the arrangement of at least one section of the connecting pin of the holder element in the recess on the insert element, in particular the recess beneath the connecting pin on the insert element in the cup-shaped state, a form-fit connection may also be produced in the circumferential direction and in a downwardly oriented direction.

Furthermore, the bottom element may have through-openings for connecting pins on the holder element. These through-openings may be arranged in an inner region of the bottom part. In particular, these through-openings may be arranged along a circular line, a radius of the circular line being smaller than a radius of an edge line of the bottom part. In this case, the holder element may have cylindrical pins extending into or through the through-openings if the insert element is arranged in, upon, or on the holder element. A diameter of the through-holes may be a predetermined amount or a predetermined percentage less than an outer diameter of these connecting pins.

In this way, a (further) connection between insert element and holder element may be provided, this connection providing a form-fit connection in a direction oriented perpendicular to a center axis of a through-opening, and providing a force-fit connection in upwardly or downwardly oriented directions. Due to the aforesaid connection types, a reliable mechanical link between the insert element and the holder element is obtained and may be produced and released in a simple manner.

In another embodiment, the device comprises at least one attaching means for attaching the device to or in the group head of the espresso machine. The attaching means may in particular attach the device to a bayonet closure section of the group head. In other words, the attaching means may be used to mount the device in the bayonet connection part of the group head. The bayonet closure section of the group head may comprise or embody the portafilter groove. In particular, the cup-shaped element, more particularly the holder element, may have or embody the attaching means. The attaching means may further provide a form-fit connection between the device and the group head. However, the attaching means is designed such that a rotation of the device is still possible in the attached state, in particular in the mounted state. In particular, the attaching means may be embodied as a cam section that projects from an outer lateral surface of the cup-shaped element, of the holder element. These may be arranged in the portafilter groove. This advantageously results in convenient handling of the device for cleaning the espresso machine.

In another embodiment, the device has or embodies at least one guide means for guiding the water flowing out of an inner volume of the bristle carrier element, in particular of the cup-shaped element. The guide mans may provide specific guidance for the water flowing out and thus prevent or at least reduce uncontrolled dripping.

In another embodiment, the bristle carrier element, in particular the cup-shaped element, has or embodies a drain channel on an outer lateral surface or on a section thereof. The drain channel may be a guide means. A drain channel may be embodied, for instance, by a section projecting from the outer lateral surface. The drain channel may be embodied as an integral section of the bristle carrier element, in particular of the cup-shaped element, more particularly of the holder element, or as a component that is separate from the bristle carrier element, in particular from the cup-shaped element. The drain channel may be arranged and/or embodied such that water that exits from the inner volume e.g. via the upper end face or in the region of the upper end face and flows downward on the outer lateral surfaces is captured by the drain channel and guided. Thus the drain channel forms a guide means for a flow of draining water. The drain channel may run along the prespecified section of the outer lateral surface. The drain channel may be inclined. This may mean that a center axis of symmetry of the drain channel, or a center axis relative to a plane that is oriented orthogonal to the center longitudinal axis of the bristle carrier element, is inclined and does not run in such a plane. Soiled draining water may be guided to a desired location by the drain channel. For example, at one end the drain channel may have or embody an outlet opening or an overflow for draining water. By providing a drain channel, draining soiled water is advantageously prevented from dripping from the cup-shaped element in an uncontrolled manner. On the contrary, this water is guided deliberately and thus in a controlled manner.

In another embodiment, the device has or embodies at least one funnel-shaped element. The funnel-shaped element may be a guide means. For example, the device may have a funnel-shaped element that is arranged and/or embodied such that soiled water draining from the inner volume of the bristle carrier element, in particular of the cup-shaped element, flows into an inner volume of the funnel-shaped guide means. For example, the funnel-shaped guide means is arranged or embodied such that a discharge opening of the funnel-shaped guide means is attached above a drip cup of the espresso machine when the device is inserted into the group head. For example, a center line of the discharge opening for the funnel-shaped guide means may be arranged parallel to, preferably concentric with, the center longitudinal axis of the cup-shaped element. The funnel-shaped guide means and the bristle carrier element, in particular the holder element of the bristle carrier element, may be embodied as integral components or as separate components. For example, the funnel-shaped element may be mountable to the bristle carrier element or attached securely thereto. It is also possible for the aforesaid drain channel to guide draining water into the inner volume of the funnel-shaped element. This advantageously results in that discharging, sometimes hot, soiled water does not drip in an uncontrolled manner, but instead may be drained in targeted manner.

In one alternative embodiment, the device has or embodies at least one guide rib. The guide rib may be a guide means. For example, the guide rib may be embodied and/or arranged such that at least one guide rib is arranged beneath the bristle carrier element, in particular the cup-shaped element, and water draining from the bristle carrier element, in particular from the outer lateral surface, may drain along a bottom edge of the guide rib due to adhesion forces. Thus it may be guided out in a specific manner. In this embodiment, as well, the draining water may be guided to the guide rib by means of the aforesaid drain channel. The bottom edge may be oriented on an incline relative to the center longitudinal axis of the bristle carrier element. For example, the bottom edge and the center longitudinal axis may from an angle from a range of 10° to 80°, preferably an angle from a range 20° to 70°, more preferably an angle equal to or greater than 20°. The bottom edge of the guide rib may terminate at a wall surface, wherein a surface normal of this wall surface may be oriented orthogonal to the center longitudinal axis. Thus draining water runs along the bottom edge to the wall and then along the wall. Due to the embodiment with a guide rib, manufacture of the device is advantageously particularly simple, especially using an injection molding method.

A method for cleaning an espresso machine is also proposed, wherein a device according to one of the embodiments described in this disclosure is inserted into a group head of the espresso machine. The device may be inserted into the group head such that at least a part of a shower of the group head is arranged in an inner volume of a bristle carrier element of the device, in particular in an inner volume of a bristle carrier element embodied as a cup-shaped element. Furthermore, groove-bristle elements of the device may contact limiting walls of the portafilter groove of the group head. Alternatively or cumulatively, shower bristle elements of the device may contact the shower and possibly a seal of the group head. Furthermore, the device is rotated from an initial position about a center longitudinal axis of the bristle carrier element of the device. This advantageously results in a simple cleaning to be carried out. The invention is explained in more detail using several exemplary embodiments.

BRIEF DESCRIPTION OF THE DRAWING FIGURES

The figures show:

Figure 5:
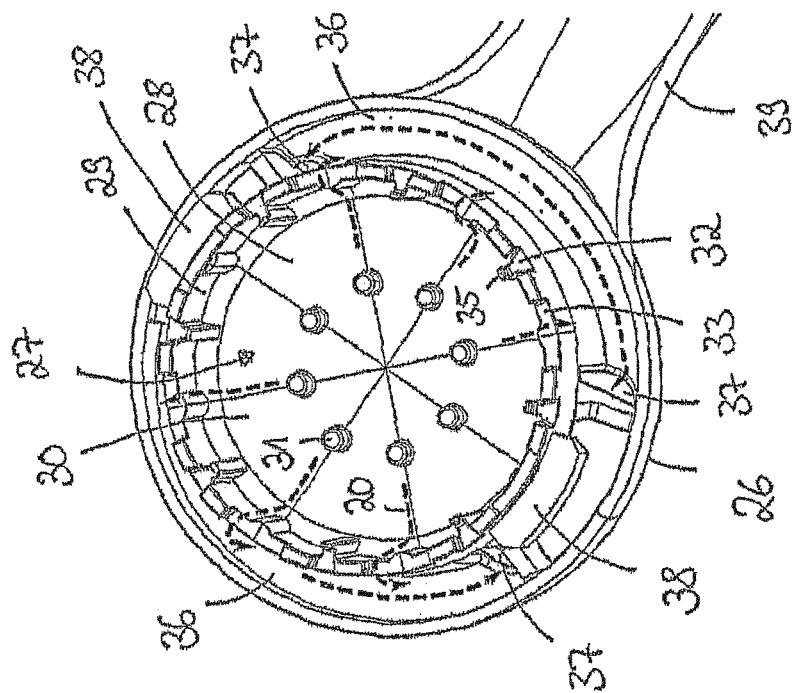
Figure 3A:
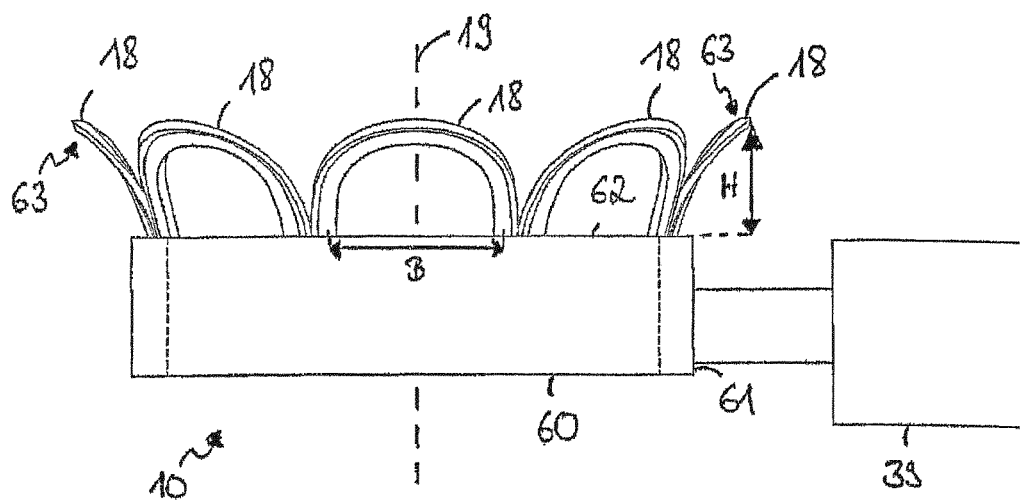
Figure 3B:
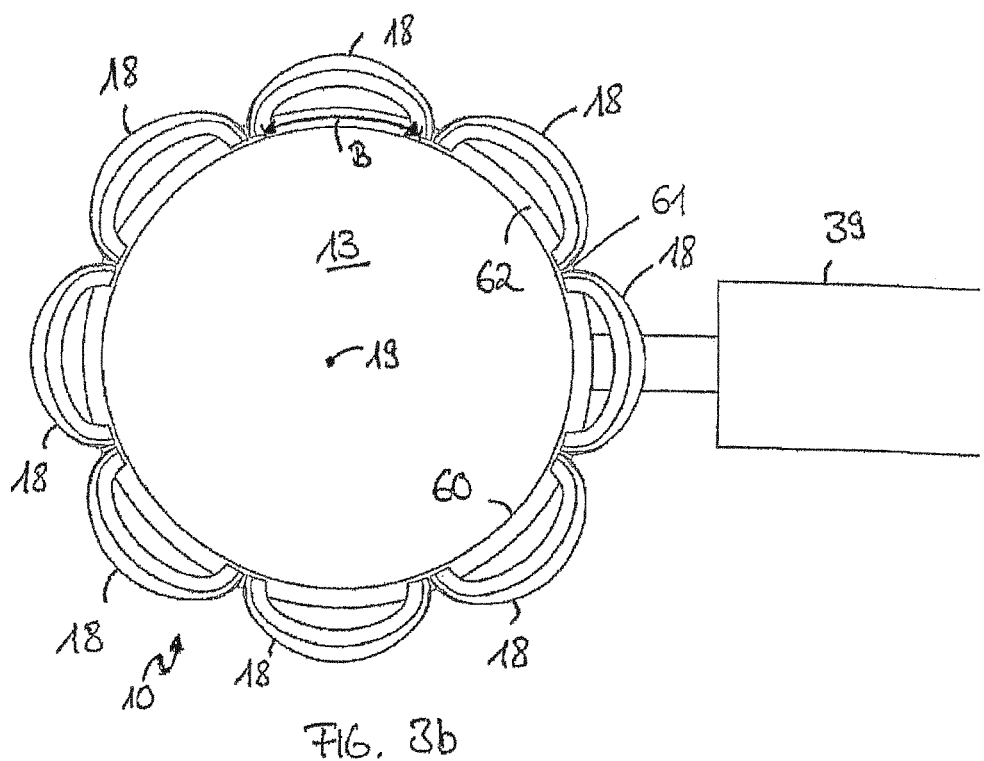
Figure 8:
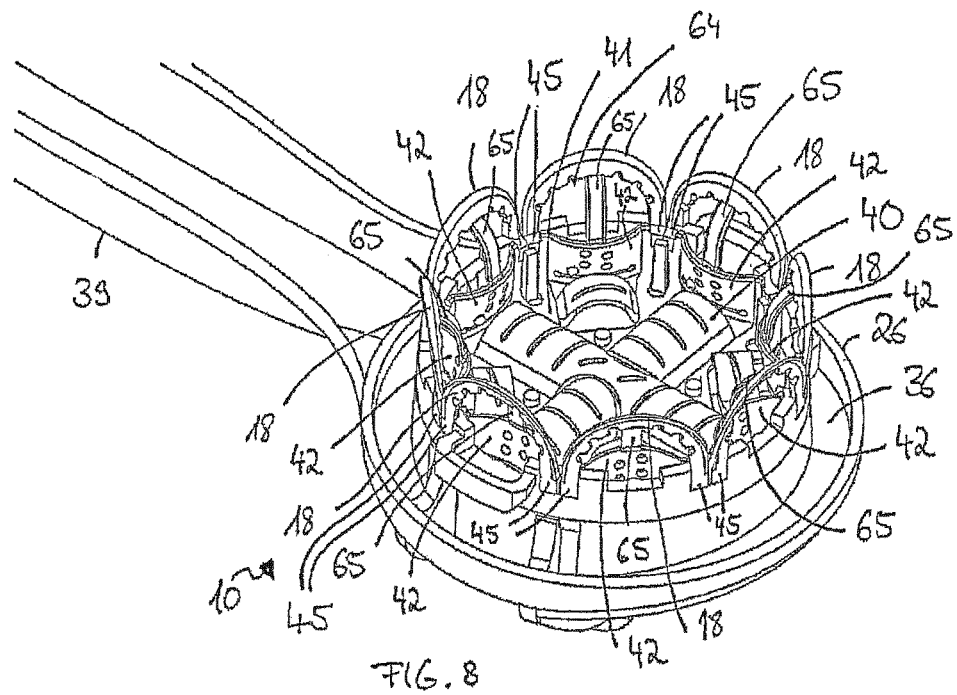
Figure 9:
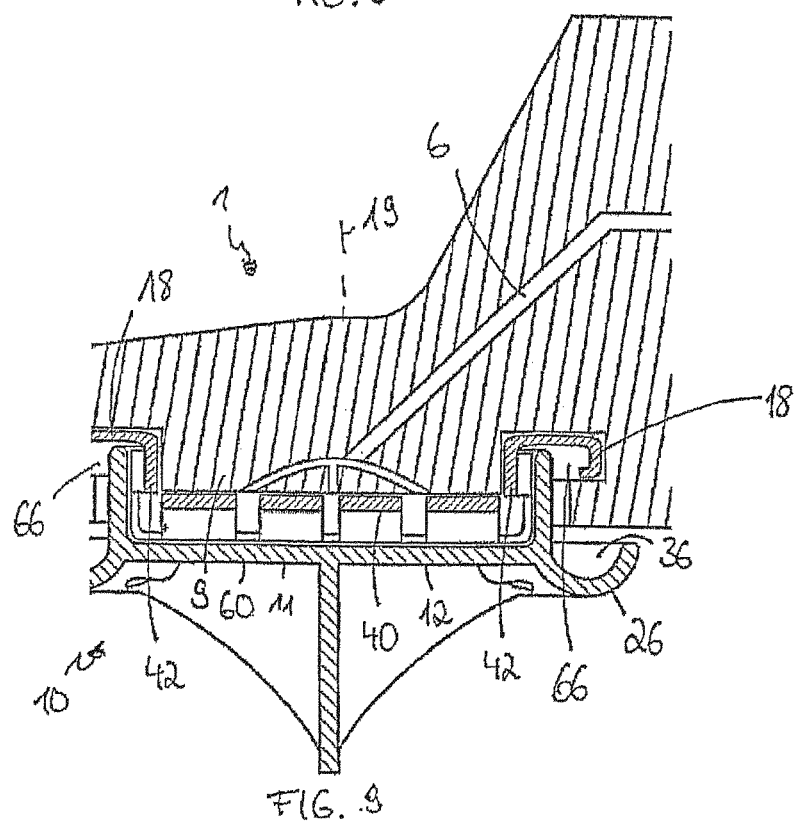
Figure 10:
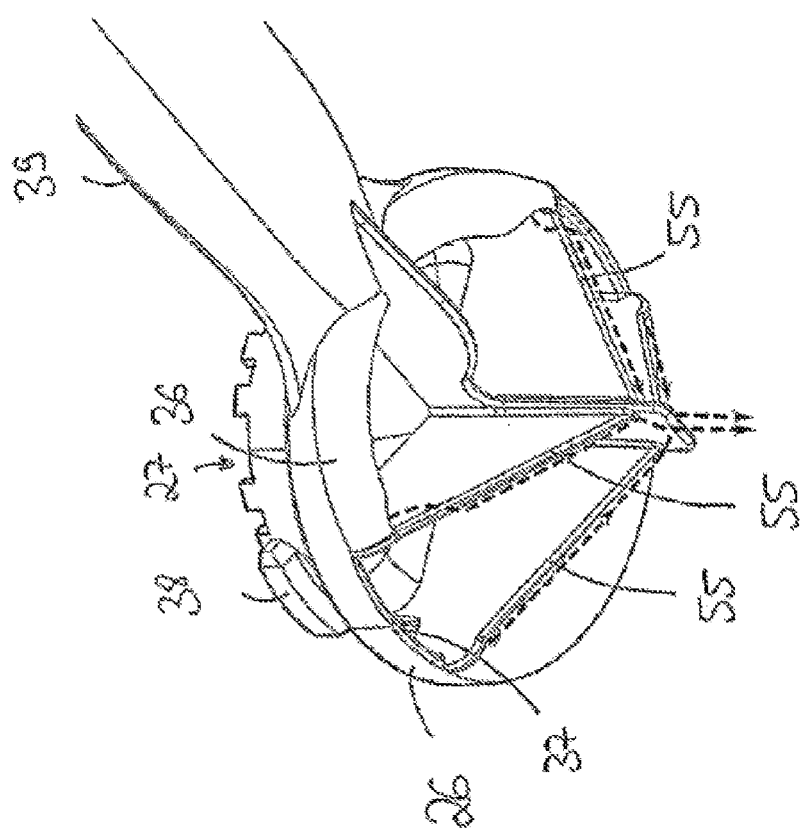
Figure 11:
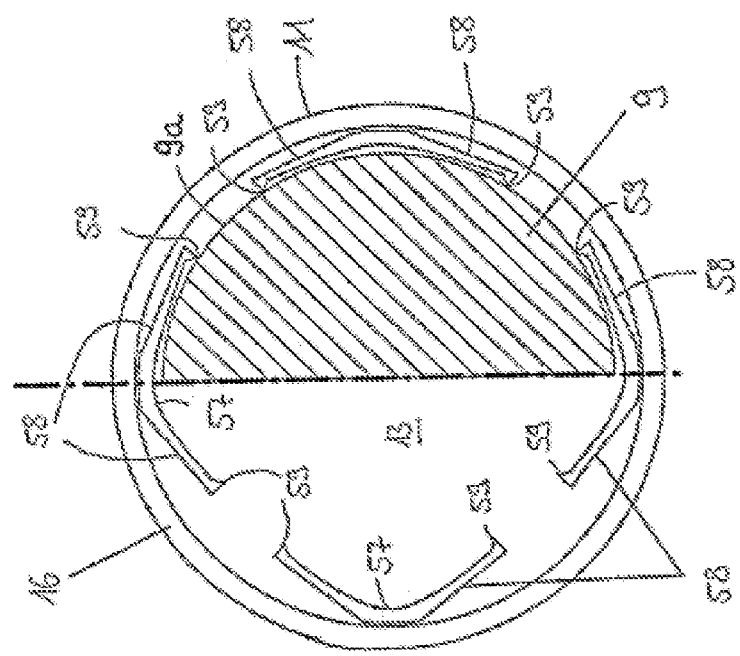

FIG. 3*a* is a schematic side view of a device according to the invention;

FIG. 3*b* is a schematic top view of the device shown in FIG. 3*a*;

FIG. 4*a* is a schematic side view of a shower bristle element in a first state;

FIG. 4*b* is a schematic side view of the shower bristle element shown in FIG. 4*a* in another state;

FIG. 4*c* is a schematic side view of the shower bristle element shown in FIG. 4*a* in another state;

FIG. 5 is a perspective elevation of a holder element;

FIG. 6 is a perspective elevation of an insert element in the unfolded state;

FIG. 7 is an exploded view of the holder element and insert element without groove-bristle elements;

FIG. 8 is a perspective view of a device according to the invention in another embodiment;

FIG. 9 is a schematic section through a group head with an inserted device;

FIG. 10 is a perspective elevation of a holder element in another embodiment; and, FIG. 11 is a schematic section through a cup-shaped element.

DETAILED DESCRIPTION OF THE PREFERRED EMBODIMENTS

In the following, identical reference number identify elements having the same or similar technical features.

Figure 2:
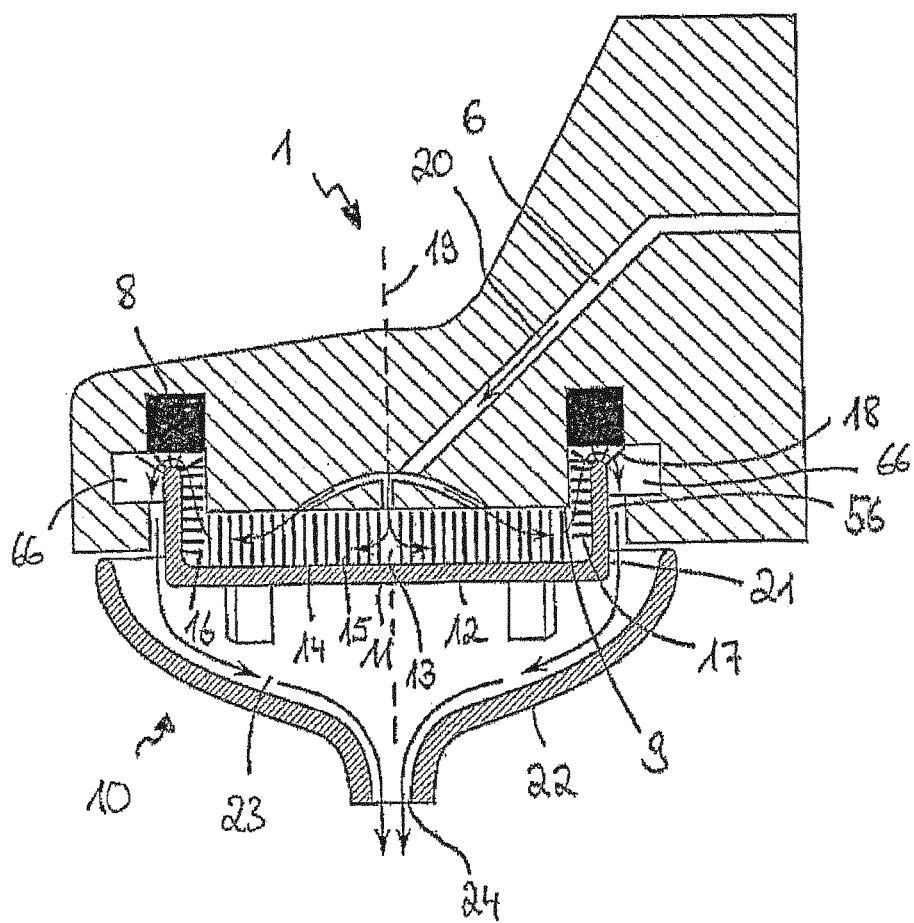
FIG. 2 is a schematic section through a group head with a loaded device according to the invention.

FIG. 2 is a perspective elevation of a device 10 according to the invention. The device 10 comprises a cup-shaped element 11, the cup-shaped element 11 having a bottom part 12 and a lateral part 56. The cup-shaped element 11 comprises an inner volume 13. Further, the cup-shaped element 11 is upwardly open. This may mean that the cup-shaped element 11 is open toward the group head when the device 10 is in the inserted state, in which the device 10 is inserted into the group head 1. In particular, parts of the group head 1, in particular the shower 9, may project into the inner volume 13 due to the opening. It is furthermore illustrated that bristle elements 15 are arranged on a bottom surface 14 of the bottom part 12 facing the inner volume 13. For the sake of clarity, only one bristle element 15 is provided with a reference number. These bristle elements 15 extend from the bottom surface 14 into the inner volume 13.

Furthermore illustrated is that additional bristle elements 17 are arranged on an inner lateral surface 16 of the cup-shaped element 11 that faces the inner volume 13. For the sake of clarity, only one additional bristle element 17 is provided with a reference number. The additional bristle elements 17 extend into the inner volume 13 away from the inner lateral surface 16. Further illustrated is that groove-bristle elements 18 are arranged on an upper end face of the cup-shaped element 11, the end face forming a cup edge, wherein these groove-bristle elements 18 extend from the upper end face into a volume outside the inner volume 13. The upper end face is an end face at the open end of the cup-shaped element 11.

When the device 10 is inserted, the bristle elements 15 arranged on the bottom surface 14 come into mechanical contact with an underside of the shower 9, wherein outlets for the water supply channel 6 are arranged on the underside. Likewise, the additional bristle elements 17 arranged in the inner lateral surface 16 come into mechanical contact with an outer lateral surface of the shower 9. Furthermore, the additional groove-bristle elements 18, which are arranged on the upper end face, come into mechanical contact with the seal 8 and possibly also with a section of the outer lateral surface of the shower 9 as well as other sections of a limiting wall of a portafilter groove 66. The seal 8 forms part of an upper limiting wall of a portafilter groove 66.

Figure 1:
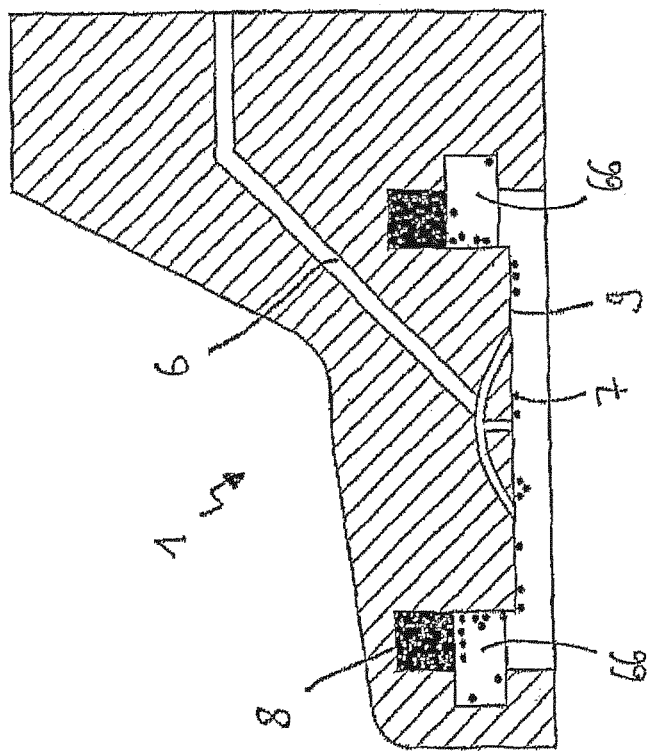
FIG. 1 is a schematic section through a group head with coffee residue.

A center axis of symmetry 19 of the cup-shaped element 11 is also illustrated. For cleaning, the cup-shaped element 11 is rotated out of an initial position about the center axis of symmetry 19, for example by +/−30°. During this rotation, the bristle elements 15 arranged on the bottom surface 14 wipe the underside of the shower 9, the additional bristle elements arranged on the inner lateral surface 16 wipe the outer lateral surfaces of the shower 9, and the groove-bristle elements 18 arranged on the upper end face wipe the seal 8 and possibly other sections of a limiting wall of the portafilter groove 66. In this way, adhering coffee residue 7 (see FIG. 1) may be released from the shower 9 and the seal 8 by mechanical contact. This may be supported if water, in particular hot water, is supplied through the water supply channel 6 during cleaning, in particular during the rotation. In FIG. 2, a flow profile of the water supplied is illustrated by the arrows 20. The water flows into the inner volume 13 of the cup-shaped element 11 through the water supply channel 6 of the group head 1 and through the outlets arranged on the underside of the shower 9. This fills the inner volume 13 with water. When the inner volume 13 is filled, the water passes over the upper end faces of the cup-shaped element 11 and flows along an outer lateral surface 21 of the cup-shaped element 11. In doing so, the flowing water may transport released coffee residue 7, so that the released coffee residue 7 may be transported out of the inner volume 13.

FIG. 2 illustrates that the device 10 comprises a funnel-shaped element 22 arranged beneath the cup-shaped element 11. The funnel-shaped element 22 is in particular arranged and embodied such that the water flowing along the outer lateral surfaces 21 flows into an inner volume 23 of the funnel-shaped element 22 and then flows out of this inner volume 23 through a center outlet opening 24 of the funnel-shaped element 22. It is illustrated that a part of the cup-shaped element 11 is arranged in the inner volume 23 of the funnel-shaped element 22. It is furthermore illustrated that a center axis of symmetry of the funnel-shaped element and of the center outlet opening 24 is arranged concentric with the center axis of symmetry 19 of the cup-shaped element 11. The water flowing out of the center outlet opening 24 may flow into a drip tray or drainage device that is generally present in an espresso machine.

FIG. 3a is a schematic side view of a device 10 according to the invention for cleaning espresso machines. The device 10 comprises a hollow-cylindrical bristle carrier element 60 that has a lateral part 61. The bristle carrier element 60 may be open to the top and bottom. Parts of the group head 1, in particular the shower 9, may thus project into the inner volume 13 (see FIG. 3b) enclosed by the bristle carrier element 60 due to the opening.

Furthermore illustrated is a handle 39 that is arranged on the bristle carrier element 60.

A center axis of symmetry 19 of the bristle carrier element 60 is also depicted.

Groove-bristle elements 18 are also illustrated. These groove-bristle elements 18 are arranged on an end face 62, in particular an upper end face 62, of the bristle carrier element 60. Furthermore illustrated is that the groove-bristle elements 18 project from this end face 62 and that the groove-bristle elements 18 have an arcuate embodiment.

It may be seen from the exemplary embodiments illustrated in FIGS. 3a and 3b that the groove-bristle elements 18 project outward in the radial direction relative to the center axis of symmetry 19 of the bristle carrier element 60. In particular, at least one part of the groove-bristle elements 18 is curved outward in the radial direction. In particular, sections on an outer edge of the arcuate groove-bristle elements 18 may be curved or bent outward.

It is further illustrated that the ends of the arcuate groove-bristle elements 18 terminate at the end face 62 and in particular are attached thereto. It is possible for the bristle carrier element 60 and the groove-bristle elements 18 to be embodied in one piece, e.g. as an injection-molded part.

It is further illustrated that a width of a groove-bristle element is greater than a height H of the groove-bristle element over the end face 62. In this case, the height H is measured along or parallel to the center axis of symmetry 19. The width B of a groove-bristle element 18 is a dimension along the circumference from a first end to the other end of the arcuate groove-bristle element 18.

FIG. 3b is a schematic top view of the device 10 illustrated in FIG. 3a. In particular it may be seen that groove-bristle elements 18 are arranged along the entire circumference of the bristle carrier element 60 on its end face 62. Furthermore, the arcuate shape of a single groove-bristle element 18 may also be seen, the arcuate groove-bristle elements 18 each enclosing an inner volume. It may also be seen from FIG. 3b that at least a part or a partial section of the groove-bristle elements 18 are curved or bent outward in the radial direction relative to the hollow-cylindrical bristle carrier element 60.

FIG. 4a is a schematic side view of a bristle element 15b in another embodiment. The bristle element 15b illustrated in FIG. 4a may be a bristle element that may be arranged on a bottom surface 14 of a cup-shaped element 11. The bristle element illustrated in FIG. 4a may also be a groove-bristle element 18, in particular an arcuate groove-bristle element 18. Furthermore, an arrow 25 indicates a direction of movement of a relative movement between the bottom surface 14 and a surface to be cleaned, for example, an underside of a shower 9. The bristle element 15b may be embodied in a plate shape. Furthermore illustrated is that both a first end of the bristle element 15b and another end of the bristle element 15b are connected to the bottom surface 14. This means that the bristle element 15b has no free end. It is further illustrated that the bristle element 15b is embodied arcuate in shape and projects from the bottom surface 14 into an inner volume 13 (see FIG. 2) of the cup-shaped element.

In FIGS. 4b and 4c, the bristle element 15b illustrated in FIG. 4a is shown in other states that occur when the direction of movement of the relative movement between bottom surface 14 and shower 9 is changed. It may be seen that the deformations of the bristle element 15b are less pronounced, compared to the states illustrated in FIGS. 4b and 4c.

FIG. 5 is a perspective elevation of a holder element 26 of the cup-shaped element 11. The holder element 26 has or embodies a cup-shaped section 27. A center axis of symmetry of the cup-shaped section 27 of the holder element 26 may be concentric with the center axis of symmetry 19 (see FIG. 2) of the cup-shaped element 11.

The cup-shaped section 27 comprises a bottom part 28 and a lateral part 29. Arranged on a bottom surface 30 of the bottom part 28, which bottom surface faces an inner volume of the cup-shaped section 27, are cylindrical connecting pins 31 that extend away from the bottom surface 30 into the inner volume. For the sake of clarity, only one connecting pin 31 is provided with a reference number. It is furthermore illustrated that an upper end face of the cup-shaped section 27, in particular of the lateral part 29, has recesses 32, 33, wherein the upper end face embodies the cup edge of the cup-shaped section 27. These recesses 32, 33 are arranged at a distance from one another along a circumferential direction of the lateral part 29. Thus, crenellated sections are embodied on the upper end face of the lateral part 29 between two recesses 32, 33 adjacent along the circumferential direction. Recesses 32 may be referred to as so-called connection recesses. These receive a connecting pin 34 on the insert element (see FIG. 7). These recesses 32 may have a length of 2 mm along the circumferential direction. A guide strip 35 is arranged along a radial direction that is oriented away from a center axis of symmetry of the cup-shaped section 27, in front of the connection recess 32. A radially outwardly oriented lateral surface of the guide strip 35 as well as the lateral surfaces of the crenellated sections adjacent to the connection recess 32 delimit a receiving volume in which the aforesaid connecting pin 34 on the insert element may be arranged. The receiving volume may in particular be embodied in the shape of a partial pyramid, wherein its width increases along the radial direction. Additional recesses 33 of the cup-shaped section 27 may also be referred to as outflow recesses 33. These permit water, in particular dirty water, to flow out of the inner volume of the cup-shaped section 27, as schematically indicated by arrows 20.

FIG. 5 illustrates that connection recesses 27 and drain recesses 33 have mutually different dimensions, in particular mutually different widths along the circumferential direction. Furthermore illustrated is that the device 10, in particular the holder element 26, has two drain channels 36. These drain channels 36 are arranged on an outer lateral surface of the cup-shaped section 27 of the holder element 26. The drain channels 36 project from this outer lateral surface and embody a depression in which the water flowing along the outer lateral surfaces is received and discharged. It is illustrated here that the drain channels 36 are inclined. Due to the inclination, the water disposed in the drain channel 36 is either guided to a first end or another end of the drain channel 36, wherein through-openings 37 through which the water flows out of the drain channel 36 are arranged at each of the ends. Also illustrated is that cams 38 are arranged on the outer lateral surface of the cup-shaped section 27 of the holder element 26 and allow the device 10 to be held in the group head 1. In particular, the cams 38 interact with guide grooves of the group head 1, which are part of the bayonet closure device of the group head 1. It is illustrated that no drain channel 36 is arranged in a region beneath the cams 38. In particular, the drain channels 36 extend along the circumference of the cup-shaped section 27 only in the sections above which no cam 38 is arranged. Furthermore illustrated is a handle 39 of the holder element 26, which handle is used to manually actuate the device 10.

FIG. 6 is a perspective elevation of an insert element 40 in an unfolded state. The insert element 40 comprises a bottom part 41 and eight lateral parts 42 of the insert element 40. It is illustrated that the bottom part 41 of the insert element 40 has a circular edge. Furthermore, the bottom part 41 has slotted plates 43 formed or embodied in an arcuate shape. The arcuate plates 43 are bent such that they project upward from a bottom surface 44 of the bottom part 41. Embodied between the slots of the arcuate plates 43 are webs that embody the bristle elements 15 arranged on the bottom surface 14 (see FIG. 2).

FIG. 6 illustrates that the slots are inclined to a plane, this plane being oriented perpendicular to a center axis of the respective arcuate plate. Angles of inclination may be in a range of 0° (exclusive) to 45° (inclusive). The lateral parts 42 project in the radial direction from the bottom part 41 of the insert element 40, the radial direction being oriented outward from a center axis of the bottom part 41. The lateral parts 42 each comprise two edge webs 45, another arcuate slotted plate 46 being arranged between the edge webs 45. Embodied between the slots of this plate 46 are webs that, in the cup-shaped state of the insert element 40, embody other bristle elements 17 that are arranged on an inner circumferential surface 16 (see FIG. 2). These slots may also be inclined with respect to a plane oriented perpendicular to a center axis of the arcuate slotted plate 46. Further illustrated is that the lateral parts 42 are pivotably attached to the bottom part 41 of the insert element 40. Arrows 47 indicate that lateral parts may be pivoted such that the insert element is moved from the unfolded state illustrated in FIG. 6 to a cup-shaped state, wherein the cup-shaped state is shown, e.g., in FIG. 7. Further illustrated is that, in the radial direction, additional webs 48 having a free end, which webs in the cup-shaped state of the insert element 40 embody additional bristle elements 18, are embodied in the radial direction on outer end faces of the arcuate slotted plates 46 of the lateral parts 42 and these bristle elements 18 are arranged on an upper end face of the cup-shaped element 11 (see FIG. 2).

FIG. 7 is an exploded view of a device 10 according to the invention having a holder element 26 and an insert element 40 in the cup-shaped state. Furthermore, arrows 54 illustrate that, in the cup-shaped state, the insert element 40 is arranged in an inner volume of the cup-shaped section 27 of the holder element 26. This also produces the mechanical link between the insert element 40 and the holder element 26. Groove-bristle elements 18 are also depicted.

FIG. 8 is a perspective elevation of a device 10 according to the invention in another embodiment. In this embodiment, as described in the foregoing, the device 10 comprises a holder element 26 and an insert element 40. For further details of the holder element 26 shown in FIG. 8, refer to the explanations for FIG. 7.

For details regarding the embodiment of the insert element 40, refer to the explanations for FIG. 5 and FIG. 6, wherein in these embodiments the insert element 40 has no arcuate groove-bristle elements 18.

In contrast to the embodiments depicted in these figures, the insert element 40 illustrated in FIG. 8 thus comprises or embodies arcuate groove-bristle elements 18. In this case, it is illustrated that a groove-bristle element 18 projects from an end face of a lateral part 42 of the insert element 40. The insert element 40 having the groove-bristle elements 18 may be embodied as a monolithic component, in particular as an injection-molded part.

A first end of the arcuate groove-bristle element 18 is attached to an edge web 45 or to a part of a connecting pin 51 (see FIG. 6) of a lateral part 42 of the insert element 40. The other arc end of the arcuate groove-bristle element 18 is attached to another edge web 45 or to a part of a connecting pin 51 of this lateral part 42.

Furthermore, it may be seen that the arcuate groove-bristle elements 18 have or embody an outer arcuate edge section that is outwardly curved or bent in the radial direction. Recesses 64 are arranged on an inner arc edge, only one recess 64 being provided with a reference number for the sake of clarity.

Furthermore, a center section of an arcuate groove-bristle element 18 is connected by means of a center web 65 to outer end faces of the lateral parts 42 of the insert element 40. In this case, the insert element 40, in particular also the lateral parts 42, forms the bristle carrier element 60.

In the cup-shaped state, the center webs 65 are curved inward with respect to a center longitudinal axis of the insert element 40. Thus, the center webs 65 have or embody a concave curvature.

FIG. 9 is schematic section through a group head 1 that is illustrated in a similar embodiment in FIG. 2. It is illustrated that the device 10, in particular a bristle carrier element 60 embodied as a cup-shaped element 11, is inserted from below into the group head 1. A portafilter groove 66 of the group head 1 is also illustrated. Furthermore depicted is that, in the inserted state, lateral parts 42 of an insert element 40 of the device 10 are positioned against an outer wall of the shower 9 of the group head 1.

Due to the groove-bristle elements 18, in particular due to their arrangement and embodiment, an upper edge section of a groove-bristle element 18, which upper edge section is curved or bent outward in the radial direction, comes into mechanical contact with an upper limiting wall of the portafilter groove 66 when the device 10 is inserted into the group head 1 from below. During further insertion, the groove-bristle element slides outward along this upper limiting wall in the radial direction (relative to the center axis of symmetry 19 of the insert element 40 in the cup-shaped state). This movement is determined or at least supported by the aforesaid curving or bending as well as due to the concavely curved middle web 65. Upon further insertion, that is, with a further upward movement of the bristle carrier element 60, the upper edge section reaches a radially outer limiting wall of the portafilter groove 66 and, as explained in the foregoing, slides downward as it continues to be inserted. Furthermore, the upper edge section reaches a lower limiting wall of the portafilter groove 66 during further insertion and slides along the latter along the radial direction. It may thus be seen that the groove-bristle element 18 curls outward in the radial direction.

If the device 10 is inserted completely into the group head 1, the groove-bristle element 18 or a lateral part 42 may be positioned against all the limiting walls of the portafilter groove. If the device 1 rotates about its center axis of symmetry 19, for example by actuating a handle 39, the groove-bristle element 18 and the lateral part 42 wipe along the limiting walls of the portafilter groove 66 and may thus remove adhering particles, in particular coffee residue.

FIG. 10 is a perspective elevation of a holder element 26 of another inventive device 10. Guide ribs 55 are arranged on the underside of the holder element 26. These guide ribs guide the water flowing out of the drain channels 36 through the openings 37. Due to adhesion forces, the exiting water flows along a guide edge of the guide ribs 55. A lower guide edge of the guide ribs runs from an outer lateral surface of the cup-shaped section 27 of the holder element 26 to a center longitudinal axis of this cup-shaped section 27 and is inclined to a plane that is oriented perpendicular to this center longitudinal axis. Due to the aforesaid adhesion forces and to the force of gravity acting on the water, the water is thus guided to a center section beneath the cup-shaped section 27 and may drip off therefrom, in particular into a drip container or drainage device of an espresso machine. In order to insert the device 10 according to the invention, the user may place or insert the insert element 40 into the cup-shaped section 27 of the holder element 26. To this end, the insert element 40 in the unfolded state may be placed over the cup-shaped section 27. Then the bottom part 41 of the insert element 40 may be oriented and pressed towards the bottom part of the cup-shaped section 27 such that the through-openings 49 (see FIG. 6) are wiped over the connecting pins 31 on the holder element. During this insertion, the lateral parts 42 are pivoted relative to the bottom part 41 of the insert element 40 and, as explained in the foregoing, then embody the cup-shaped state with the connecting pins 34. These connecting pins 34 are inserted into the connection recesses 32 of the cup-shaped section and also attached to the holder element 26. The device 10 is now ready for operation. A user may actuate the device 10 in that he actuates the handle 39 and inserts the device, in particular the cup-shaped element 11 into a group head 1 of an espresso machine from below, like a portafilter 4. Now the cams 38 of the holder element 26 may be mounted in a helical groove of a bayonet connection to the group head 1 so that the device may be connected to the espresso machine in a form fit, without manual support. In this case the guide strips 35 of the cup-shaped element 11 may be centered relative to a shower of the group head, so that the cup-shaped element 11 is prevented from being improperly positioned in the group head 1. In particular, the guide strips 35 may be positioned against outer lateral surfaces of the shower 9. Then the user may turn on a water pump for the espresso machine and rotate the device about its center axis of symmetry by actuating the handle 39, in particular rotating alternately, more particularly rotating alternately by about 30°. The bristle elements 15, 17, 18 embodied by the insert element 40 rub over the surface of the group head to be cleaned so that coffee residue 7 adhering there is released and removed.

The user may control the success of the cleaning process in that he watches the soiled water as it runs off. After an initial phase with clearly visible dark coloration due to the coffee residue 7, the water running off is clear after about 20 to 30 s. The pump may then be turned off. The cleaning process has concluded and the device 10 may be removed from the group head 1 using a corresponding rotation.

However, it is also possible to place a cleaning agent, for instance a cleaning agent provided in the form of a tablet, into the inner volume 13 of the cup-shaped element 11 and to insert the cup-shaped element 11 into the group head as explained in the foregoing. Then the water supply may be started until the water moves over the edge of the cup-shaped element 11. Then the water pump may be turned off and the mixture of water and cleaning agent may be allowed to stand for a specified period of time. Using diffusion, the cleaning agent may distribute up into the shower 9 of the group head 1 and there dissolve fats, e.g. coffee fats and oils. These deposit in particular on the inside of the shower 9 and partially in the water supply channels 6 and thus the bristle elements 15, 17, 18 cannot reach them. During such cleaning, the device 10 advantageously ensures that the dissolved cleaning agent does not, due to overpressure, travel too far into the water supply channels 6 and water discharge channels of the espresso machine or into corresponding valves of the group head 1. At those location the cleaning agent may dissolve lubricants that may be necessary for low-friction and low-wear operation. Due to the recesses 33 in the device 10, no overpressure can build up when the water flows into the inner volume 13 of the cup-shaped element 11, so that the aforesaid problem is prevented.

FIG. 11 is a section through a cup-shaped element 11 in another embodiment. In this embodiment, bristle elements 15 that are arranged on the inner lateral surface of the cup-shaped element 11 are embodied as wiper elements 57. A wiper element 57 has two legs 58 that each extend obliquely to the radial direction into the inner volume 13 of the cup-shaped element 11. The legs 58 have a wiping projection 59 at each free end. These wiping projections may be embodied, e.g., by a thickening of the leg 58 towards the free end, wherein the thickening is embodied such that a tip of the wiping projection may contact a lateral surface 9a of a shower 9 of a group head 1 arranged in the inner volume 13. The wiper elements 57, in particular the legs 58, may be made from elastic material. If the tip of the wiping projection 59 contacts a lateral surface 9a of a shower 9 arranged in the inner volume 13, due to a spring force generated by the bending of the legs 58, the legs 58 may be pressed against the lateral surface 9a of shower 9. When the cup-shaped element 11 is rotated, the wiping projections 59 of the legs 58 wipe along the lateral surface and may thus release coffee residue 7 (see FIG. 1).

The left-hand half of FIG. 11 is the section without shower 9 arranged in the inner volume 13, while the right-hand half is a section with shower 9 arranged in the inner volume 13. FIG. 11 does not illustrate that wiper element 57 may also be arranged on the bottom surface 14 of the cup-shaped element 11 (see FIG. 2).

The invention claimed is:

1. A device for cleaning espresso machines, wherein the device can be inserted similar to a portafilter in a group head of an espresso machine for cleaning, wherein the device comprises at least one cup-shaped element wherein at least one bristle element is arranged on a bottom surface of the cup-shaped element, characterized in that at least one further bristle element is arranged on an inner lateral surface of the cup-shaped element;

characterized in that at least one or the other or both of the following is provided: (i) the said at least one bristle element arranged on the bottom surface is arcuately disposed, wherein both a first end of the bottom surface bristle element and another end of the bottom surface bristle element are each connected to the bottom surface and (ii) and the said at least one further bristle element is arcuately disposed, wherein both a first end of the further bristle element and another end of the further bristle element are each connected to the inner lateral surface.

2. The device according to claim 1, characterized in that the cup-shaped element has an end face, and that at least one additional further bristle element is arranged on the end face of the cup-shaped element.

3. The device according to claim 1, characterized in that at least one of said bristle elements is plate-shaped or comprises fibers or is embodied as a wiping element.

4. The device according to claim 1, characterized in that at least one or the other or both of the following is provided: (i) the bottom surface bristle element is formed by a slotted plate, and (ii) the further bristle element is formed by a slotted plate.

5. The device according to claim 1, characterized in that the cup-shaped element has an end face, and that the end face of the cup-shaped element in a cup-shaped state has at least on recess.

6. The device according to claim 1, characterized in that the device has or embodies at least one guide means for guiding the water flowing out of an inner volume of the cup-shaped element.

7. The device according to claim 6, characterized in that the cup-shaped element has or embodies at least one drain channel on an outer lateral surface.

8. The device according to claim 6, characterized in that the device comprises or embodies at least one funnel-shaped element.

9. The device according to claim 6, characterized in that at the device comprises or embodies at least one guide rib.

10. The device according to claim 1, characterized in that the device comprises at least one attaching means for attaching the device to or in the group head of the espresso machine.

11. The device according to claim 1, characterized in that the cup-shaped element is embodied by at least one insert element and at least one holder element, wherein the insert element has or embodies at least one bristle element, wherein the insert element may be arranged in, upon, or on the holder element.

12. The device according to claim 1, characterized in that the cup-shaped element is embodied by at least one insert element and at least one holder element, wherein the insert element has or embodies at least one bristle element, wherein the insert element may be arranged in, upon, or on the holder element, and wherein the insert element comprises at least one bottom part and at least one lateral part, wherein the bottom part has or embodies at least one bristle element of the bottom surface and the at least one lateral part has or embodies at least one bristle element of the inner lateral surface.

13. A device for cleaning espresso machines, wherein the device can be inserted similar to a portafilter in a group head of an espresso machine for cleaning, wherein the device comprises at least one cup-shaped element wherein at least one bristle element is arranged on a bottom surface of the cup-shaped element, characterized in that at least one further bristle element is arranged on an inner lateral surface of the cup-shaped element;

characterized in that the cup-shaped element is embodied by at least one insert element and at least one holder element, wherein the insert element has or embodies the at least one bristle element, wherein the insert element is arrangeable in, upon, or on the holder element; and characterized in that the at least one insert element comprises at least one bottom part and at least one lateral part, wherein the at least one bottom part has or embodies the at least one bristle element of the bottom surface and the at least one lateral part has or embodies the at least one bristle element of the inner lateral surface; and characterized in that the at least one lateral part is pivotally attached to the bottom part.

14. The device according to claim 13, characterized in that the bottom part and/or the lateral part has or embodies at least one connecting means for mechanically connecting the insert element to the holder element.

15. The device according to claim 14, characterized in that the insert element comprises at least two lateral parts, wherein the edge sections of the lateral parts are embodied such that, in a cup-shaped state of the insert element, at least one or the other or both of the following is provided: (i) at least one connecting pin disposed on the insert element for arrangement in a recess on the holder element, and (ii) at least one recess is disposed on the insert element for receiving a connecting pin on the holder element.

16. The device according to claim 14, characterized in that the bottom part has or embodies at least one recess for receiving a connecting pin on the holder element.

17. A method for cleaning an espresso machine, comprising:

a) inserting a device for cleaning espresso machines similar to a portafilter in a group head of an espresso machine for cleaning, the device comprising at least one cup-shaped element having a center longitudinal axis wherein at least one bristle element is arranged on a bottom surface of the cup-shaped element, characterized in that at least one further bristle element is arranged on an inner lateral surface of the cup-shaped element;

wherein at least one or the other or both of the following is provided: (i) the said at least one bristle element arranged on the bottom surface is arcuately disposed, wherein both a first end of the bottom surface bristle element and another end of the bottom surface bristle element are each connected to the bottom surface and (ii) and the said further bristle element is arcuately disposed, wherein both a first end of the further bristle element and another end of the further bristle element are each connected to the inner lateral surface, and b) rotating the device from an initial position about the center longitudinal axis of the cup-shaped element of the device.

18. A device for cleaning espresso machines, wherein the device can be inserted similar to a portafilter in a group head of an espresso machine for cleaning, wherein the device comprises at least one cup-shaped element wherein at least one bristle element is arranged on a bottom surface of the cup-shaped element, characterized in that at least one further bristle element is arranged on an inner lateral surface of the cup-shaped element, wherein the device has or embodies at least one guide means for guiding the water flowing out of an inner volume of the cup-shaped element, wherein the cup-shaped element has or embodies at least one drain channel on an outer lateral surface, wherein the drain channel is embodied by a section projecting from the outer lateral surface of the cup-shaped element, wherein the drain channel is embodied as an integral section of the cup-shaped element.

19. A device for cleaning espresso machines, wherein the device can be inserted similar to a portafilter in a group head of an espresso machine for cleaning, wherein the device comprises at least one cup-shaped element wherein at least one bristle element is arranged on a bottom surface of the cup-shaped element, characterized in that at least one further bristle element is arranged on an inner lateral surface of the cup-shaped element, wherein the device has or embodies at least one guide means for guiding the water flowing out of an inner volume of the cup-shaped element to a drip cup of the espresso machine when the device is inserted into the group head, wherein the device comprises or embodies at least one funnel-shaped element providing the guide means, wherein a gap for receiving water is presented between the funnel-shaped element and an outer lateral surface of the cup-shaped element.

20. The device of claim 19, wherein the funnel-shaped element has a diameter, and wherein the diameter of the funnel-shaped element is larger than a diameter of the receiving section of the group head into which the cup-shaped element is inserted.

* * * * *